United States Patent [19]

Ozaki et al.

[11] 4,100,734
[45] Jul. 18, 1978

[54] EXHAUST GAS PURIFICATION SYSTEM FOR AN INTERNAL COMBUSTION ENGINE

[75] Inventors: Tadashi Ozaki; Tokio Kohama, both of Nishio; Hideki Obayashi, Hoi, all of Japan

[73] Assignee: Nippon Soken, Inc., Nishio, Japan

[21] Appl. No.: 756,702

[22] Filed: Jan. 4, 1977

[30] Foreign Application Priority Data

Jan. 12, 1976 [JP] Japan .................. 51-2546
Jan. 23, 1976 [JP] Japan .................. 51-6937
Mar. 5, 1976 [JP] Japan .................. 51-24342

[51] Int. Cl.² .................. F02M 25/06; F02B 75/10
[52] U.S. Cl. .................. 60/278; 123/119 A
[58] Field of Search .................. 60/278; 123/119 A

[56] References Cited

U.S. PATENT DOCUMENTS

| | | | |
|---|---|---|---|
| 3,844,261 | 10/1974 | Garcea | 123/119 A |
| 3,882,837 | 5/1975 | Horie | 123/119 A |
| 3,948,044 | 4/1976 | Wakita | 60/278 |
| 4,027,638 | 6/1977 | Moriya | 123/119 A |

FOREIGN PATENT DOCUMENTS 1,380,046  1/1975  United Kingdom ........... 123/119 A

*Primary Examiner*—Douglas Hart
*Attorney, Agent, or Firm*—Cushman, Darby & Cushman

[57] ABSTRACT

An engine exhaust gas purification system comprises an E.G.R. passage for the recirculation of engine exhaust gases from an exhaust system of an engine back into an intake system downstream of an engine throttle valve. A first E.G.R. control valve is provided in the E.G.R. passage and operatively connected to the throttle valve to control E.G.R. flow through the E.G.R. passage. A second E.G.R. control valve is provided in the E.G.R. passage upstream of the first E.G.R. control valve to control E.G.R. flow toward the first E.G.R. control valve. A valve controller is provided for the second E.G.R. control valve and operative in response to the variation in the pressure in the E.G.R. passage between the first and second E.G.R. control valves to control the second E.G.R. control valve so that the pressure is maintained substantially constant.

20 Claims, 17 Drawing Figures

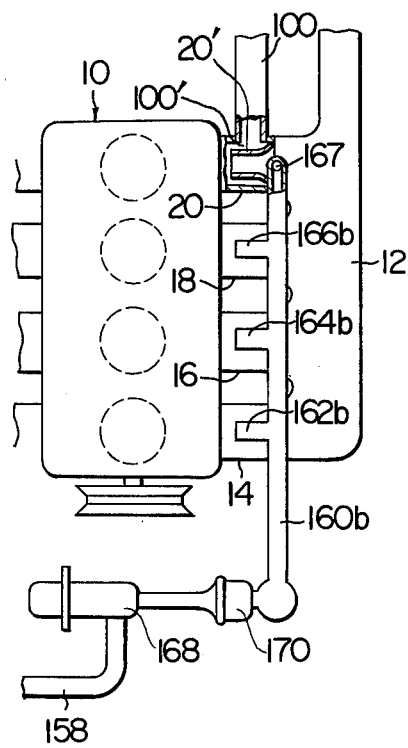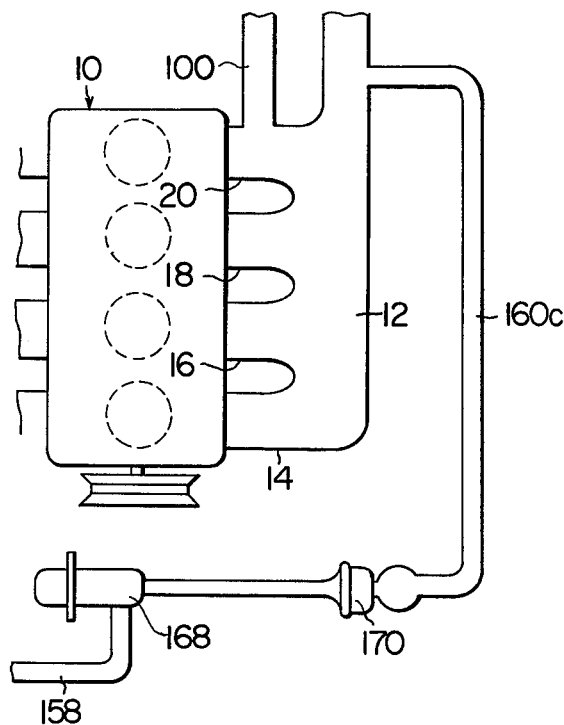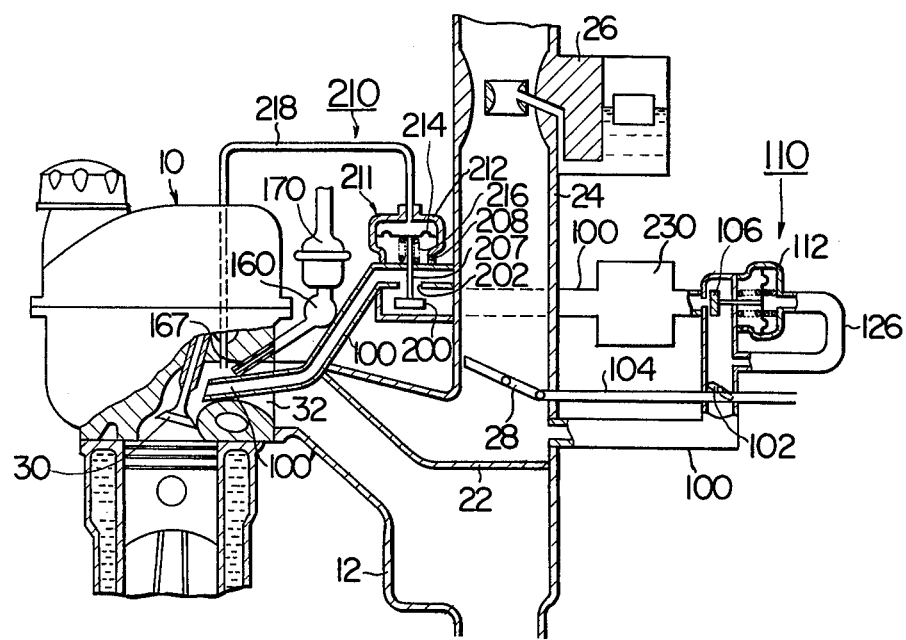

EXHAUST GAS PURIFICATION SYSTEM FOR AN INTERNAL COMBUSTION ENGINE

BACKGROUND OF THE INVENTION

1. Field of the Invention

The present invention relates to an exhaust gas purification system for an internal combustion engine which is particularly effective to reduce the emission of nitrogen oxides ($NO_x$) of the engine exhaust gases.

2. Description of the Prior Art

Environmental pollution caused by gases exhausted from engines and, particularly, from those of automobiles has been a serious problem. The main harmful components of the engine exhaust gases are nitrogen oxides ($NO_x$), carbon monoxide (CO), hydrocarbon (HC). Exhaust gas recirculation system (which is so-called "E.G.R. system") and secondary air supply system have been used to reduce the harmful components of the engine exhaust gases.

The prior art E.G.R. systems, which have been used to reduce the emission of $NO_x$, are classified into a plate type and a manifold type. In the first type, an E.G.R. passage extends from an exhaust pipe of an engine to an intake pipe upstream of a throttle valve of a carburetor and a fixed throttle member is provided in the E.G.R. passage. In the second type, the E.G.R. passage extends from the engine exhaust pipe to the intake pipe downstream of the throttle valve and an adjustable valve is disposed in the E.G.R. passage for the control of the flow of the exhaust gases back into the intake pipe.

In the first or plate type E.G.R. system, because exhaust gases flow back into the intake pipe upstream of the throttle valve, the engine back pressure, which is a function of the amount of engine intake air, is a function of the amount of E.G.R. Thus, the amount of E.G.R. is advantageously proportional to the amount of engine intake air. The E.G.R. system of this type, however, has disadvantageous problems that a deposit of foreign material is formed on the throttle valve, an advance port is blocked, the carburetor and related components of the engine suffer from thermal influence, parts made of aluminum alloys are corroded and icing occurs at a low temperature.

In the E.G.R. system of the second or manifold type, the above disadvantageous problems hardly occur because the engine exhaust gases are recirculated directly into the engine intake manifold downstream of the throttle valve. In this type of E.G.R. system, the E.G.R. flow is a function of the intake manifold vacuum and thus is increased and decreased in light and heavy load operating conditions of the engine, respectively. Thus, valve means are required for controlling the E.G.R. flow such that it is not influenced by the engine intake manifold vacuum. In a conventional E.G.R. system, the control valve means are controlled by means of intake vacuum so that the valve is closed to interrupt the E.G.R. flow only at the engine operating condition to which the E.G.R. flow is disadvantageous to the engine operation, the intake vacuum providing on-off signals depending upon the positions of the throttle valve in the intake pipe. In another conventional E.G.R. system, either intake vacuum or venturi vacuum is used to actuate E.G.R. control valve so that the valve opening is decreased and increased in light and heavy load operating conditions of the engine, respectively, in order to prevent E.G.R. flow from being influenced by intake vacuum. In any case, however, the influence of intake vacuum on the E.G.R. flow could not completely be eliminated to such an extent that the E.G.R. flow was proportional to the intake air. Thus, in the prior art E.G.R. system, E.G.R. flow was unduely increased relative to the intake air flow at a light load operating condition of engine to cause surging and misfires at this operating condition, whereas the E.G.R. flow was decreased relative to the intake air flow at a heavy load engine operating condition with resultant decrease in the intended effect of E.G.R. system to minimize emission of $NO_x$. With the prior art E.G.R. system, therefore, it has been difficult to reduce emission of $NO_x$ without adverse affect on the engine operation.

In the case where a secondary air supply system comprising an air pump has been employed to feed a secondary air into an exhaust manifold of engine, all the air discharged from the pump has normally been supplied to the exhaust manifold. The secondary intake air has influenced the engine back pressure to vary the difference between the engine back pressure and engine intake vacuum with resultant increase in the above-discussed difficulty.

In the past, the secondary air has also been fed into the exhaust port of the engine cylinder provided with exhaust gas delivery port of E.G.R. system. Thus, the secondary air has also been recirculated back into the intake pipe of the engine, so that the air-fuel ratio of the air-fuel mixture introduced into engine cylinders has been made larger than a predetermined air-fuel ratio for the engine. Thus, in the case where the predetermined air-fuel ratio for an engine was relatively small (i.e., the engine was designed to be operable with relatively rich air-fuel mixture), the introduction of the secondary air into the intake pipe increased the air-fuel ratio beyond the predetermined one and toward the stoichiometric air-fuel ratio with resultant increase in the emission of $NO_x$. On the other hand, in the case where the predetermined air-fuel ratio for an engine was relatively large (i.e., the engine was designed to be operable with a relatively lean air-fuel mixture), the introduction of the secondary air into the intake pipe of the engine unduely increased the air-fuel ratio (i.e., the air-fuel mixture was unduely diluted), which adversely affected the engine operation.

SUMMARY OF THE INVENTION

It is an object of the present invention to provide an engine exhaust gas purification system in which E.G.R. flow is controlled such that it is proportional to the flow of intake air into engine cylinders for thereby reducing $NO_x$ without adverse affect on the engine operation.

It is another object of the present invention to provide an engine exhaust gas purification system in which secondary air supply to an exhaust system is prevented from being recirculated back to an intake system for thereby eliminating or minimizing the variation in the air-fuel ratio of an air-fuel mixture fed into engine cylinders.

The exhaust gas purification system for an internal combustion engine according to the present invention comprises an E.G.R. passage for recirculating engine exhaust gases from an exhaust system of the engine back into an intake system thereof downstream of a throttle valve of the engine, a first E.G.R. control valve disposed in the E.G.R. passage and operatively connected to the throttle valve to control the E.G.R. flow through the E.G.R. passage into the engine, a second E.G.R. control valve disposed in the E.G.R. passage upstream of the first E.G.R. control valve to control the E.G.R. flow through the E.G.R. passage toward the first E.G.R. control valve so that the pressure of engine exhaust gases in the E.G.R. passage between the first and second E.G.R. control valves is maintained substantially constant.

A valve actuator may be provided for the second E.G.R. control valve and may be operative directly in response to variation in the exhaust gas pressure in the E.G.R. passage between the first and second E.G.R. control valves to actuate the second E.G.R. control valve. Alternatively, the valve actuator may be operated by a pressure signal from a signal pressure source means which may be in the form of an air pump alone, or an intake manifold of the engine alone, or a combination of the air pump and the intake manifold. Pressure transducer means may be provided and responsive to variation in the exhaust gas pressure in the E.G.R. passage between the first and second control valves to modulate the magnitude of the signal pressure from the signal pressure source means to the valve actuator.

The exhaust gas purification system of the present invention may also include a secondary air supply system and means for preventing the secondary air from flowing from the exhaust system of the engine into the E.G.R. passage.

The above and other objects, features and advantages of the present invention will be made apparent by the following description with reference to the accompanying drawings.

BRIEF DESCRIPTION OF THE DRAWINGS

FIGS. 2 to 4 diagrammatically illustrate first to third modifications of the first embodiment of the invention shown in FIG. 1;

FIG. 5 diagrammatically illustrates a second embodiment of the present invention;

DESCRIPTION OF THE PREFERRED EMBODIMENTS

Figure 1:
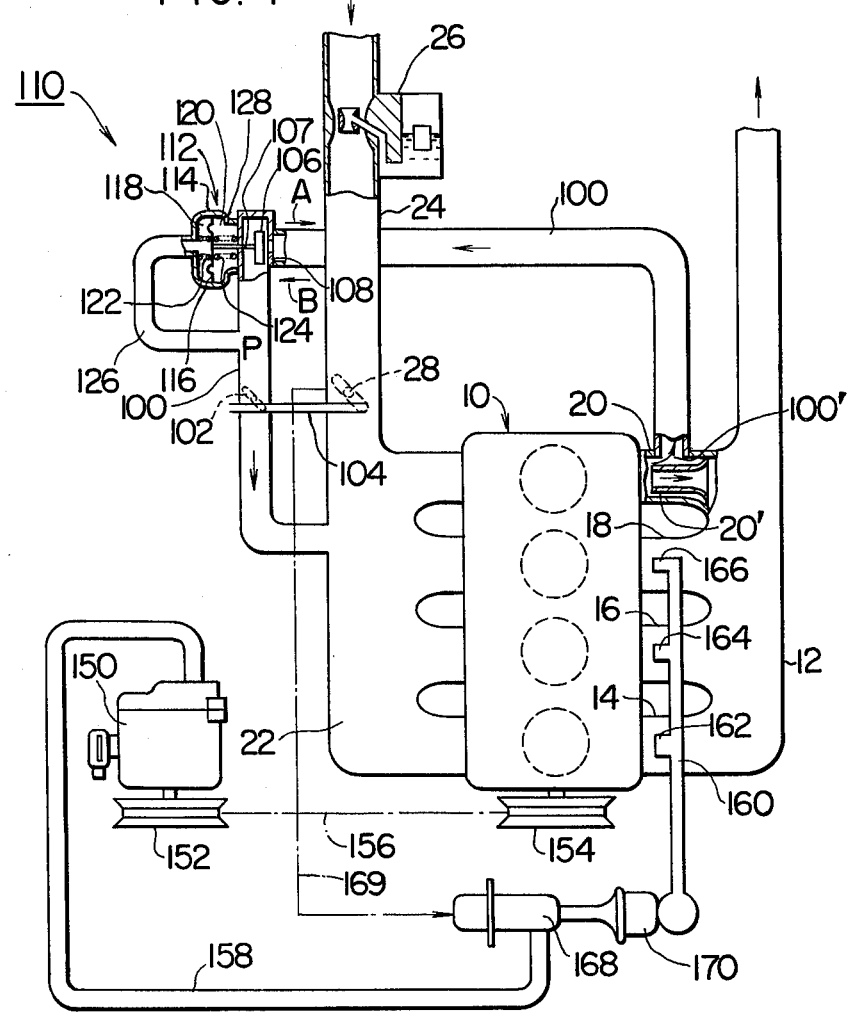
FIG. 1 diagrammatically illustrates a first embodiment of the engine exhaust gas purifying system according to the present invention.

Referring first to FIG. 1, reference numeral 10 designates a four-stroke, four-cylinder, reciprocal-piston internal combustion engine of an ordinary type having a single combustion chamber and intake and exhaust valves for each cylinder. The exhaust system of the engine 10 comprises an exhaust manifold 12 having a relatively large volume and comprising four branches 14 to 20, whereas the intake system of the engine 10 comprises an intake manifold 22 connected with an intake pipe 24 having a carburetor 26 for producing a mixture of air from an air cleaner (not shown) and gasoline from a fuel tank (not shown). A throttle valve 28 is provided in the intake pipe 24 downstream of the carburetor 26 to control the flow of the air-fuel mixture to the intake manifold 22 and thus into the cylinders. The throttle valve 28 is operable by an operator through an accelerator and a link mechanism (not shown).

In the illustrated embodiment of the invention, an exhaust gas purification system for the engine 10 comprises an exhaust gas recirculation system (hereinafter called "E.G.R. system∞") and a secondary air supply system. The E.G.R. system includes an exhaust gas recirculation passage 100 (hereinafter called "E.G.R. passage") provided by a conventional pipe having an end connected to the branch 20 of the exhaust manifold 12, the branch 20 being connected to the exhaust port (not shown) of the fourth cylinder. The other end of the E.G.R. passage 100 is connected to the intake manifold 22 of the engine 10. A first E.G.R. control valve 102 is provided in the E.G.R. passage 100 to control the cross-sectional area of the passage 100 through which E.G.R. flow can pass. The control valve 102 is in the form of a butterfly valve and operatively connected to the throttle valve 28 by a link rod 104 so that the first E.G.R. control valve 102 and the throttle valve 28 are simultaneously operated.

A second E.G.R. control valve 106 is also provided in the E.G.R. passage 100 upstream of the first E.G.R. control valve 102 to control the cross-sectional area of the E.G.R. passage through which the engine exhaust gases can flow toward the first control valve 102. The second E.G.R. control valve 106 is in the form of a poppet valve. A valve seat 108 is provided in the passage 100 for a valve head of the poppet valve 106.

The second E.G.R. control valve 106 is adapted to control the E.G.R. flow through the valve seat 108 such that the pressure in the E.G.R. passage 100 between the first and second E.G.R. control valves 102 and 106 is kept substantially constant. To this end, a pneumatic valve controller, generally designated by 110, in provided for the second E.G.R. control valve 106. The valve controller 110 comprises a pressure comparator and valve actuator 112 having a housing 114 across which a diaphragm 116 extends to divide the interior of the housing 114 into two chambers 118 and 120. A valve stem 107 of the poppet valve 106 slidably extends into the chamber 120 and is secured to the diaphragm 116. Compression coil springs 122 and 124 are provided in the two chambers 118 and 120, respectively, to resiliently bias the diaphragm 116 in the opposite directions. The chamber 118 is communicated by a conduit 126 to the E.G.R. passage 100 between the first and second E.G.R. control valves 102 and 106 so that pressure P in the E.G.R. passage 100 between the first and second E.G.R. control valves 102 and 106 is introduced through the conduit 126 into the chamber 118 of the pressure comparator 112. The other chamber 120 is communicated with the atmosphere by a vent hole 128.

The secondary air supply system includes a conventional vane type air pump 150 drivingly connected to the engine 10 by pulleys 152 and 154 and a V-belt 156 extending therebetween. The air delivery port of the air pump 150 is connected to an end of a secondary air pipe 158 the other end of which is connected to an air injection nozzle pipe 160 having air injection nozzles 162 to 166 which are respectively connected to the exhaust branches 14 to 18 of the exhaust manifold 12 of the engine 10 so that secondary air from the air pump 150 is fed into the branches 14 to 18 of the exhaust manifold 12. No secondary air is fed into the exhaust branch 20 to which the E.G.R. passage 100 is connected. Air release valve 168 and a check valve 170 are provided in the secondary air circuit between the pipe 158 and the nozzle pipe 160. The air release valve 168 is adapted to be pneumatically operated to release the secondary air to the atmosphere on deceleration of the engine 10. For this purpose, the air release valve 168 is connected by a conduit 169 to the intake pipe 24 of the engine 10 adjacent to the throttle valve 28 therein. The check valve 170 is operative to prevent reverse flow of the engine exhaust gases from the exhaust manifold 12 toward the air pump 150.

An inner tube 20' is provided in the branch 20 of the exhaust manifold 12 and extends therefrom over the opening 100' of the E.G.R. passage 100 to the branch 20 and toward the exhaust port (not shown) of the branch 20 and an upstream portion of the inner tube 20' define therebetween a generally annular space through which a part of the engine exhaust gases discharged into the branch 20 flows into the E.G.R. passage 100. The downstream end of the tube 20' engages the inner surface of the branch 20. The rest of the engine exhaust gases discharge into the branch 20 flows toward a point where all the exhaust manifold branches 14 to 20 are gathered together, so that the secondary air fed by the air nozzles 162 to 166 into the branches 14 to 18 of the exhaust manifold 12 and flowing therethrough is prevented from being introduced into the E.G.R. passage 100.

In operation, an air-fuel mixture produced by the carburetor 26 flows through the intake pipe 24 into the intake manifold 22 and into respective engine cylinders. The flow of the air-fuel mixture into the engine cylinders depends upon the opening of the throttle valve 28 and the difference between the atmospheric pressure and the intake vacuum. On the other hand, the engine exhaust gases flow from the branch 20 of the exhaust manifold 12 through the E.G.R. passage 100 back into the manifold 22 of the engine.

The pneumatic valve controller 110 is operative as follows: The pressure P in the E.G.R. passage between the first and second E.G.R. control valves 102 and 106 is applied through the conduit 126 to the chamber 118 of the pressure comparator and valve actuator 112. When the pressure P is larger than a predetermined pressure which has been preset by the two compression springs 122 and 124 and which is substantialy equal to the atmospheric pressure in the embodiment of the invention, the diaphragm 116 is displaced rightwards, as viewed in FIG. 1, to move the poppet valve 106 in the direction indicated by an arrow A in FIG. 1 so that the cross-sectional area of the E.G.R. passage 100 through which the E.G.R. flow can pass is reduced with resultant reduction in the pressure P. When the pressure P is smaller than the predetermined pressure, the diaphragm 116 is displaced leftwards, as viewed in FIG. 1, to move the poppet valve 106 in the direction indicated by an arrow B so that the cross-sectional area through which the E.G.R. flow can pass is increased with resultant increase in the pressure P in the E.G.R. passage 100 between the first and second E.G.R. control valves 102 and 106.

As such, the pressure P is kept at a substantially constant value which is substantially equal to the atmospheric pressure. Thus, the amount of E.G.R. flow through the E.G.R. passage 100 into the intake manifold 22 of the engine 10 depends upon the opening of the first E.G.R. control valve 102, which is operatively connected to the engine throttle valve 28, and the difference between the pressure P and the intake vacuum of the engine 10. Accordingly, the amount of E.G.R. flow is always in proportion to the amount of intake air. This advantageously prevents the prior art problems that the amount of E.G.R. flow is unduely increased at a light load operating condition of the engine to cause engine surging and misfires and that the amount of E.G.R. flow is unduely reduced at a heavy load engine operating condition to lower the intended effect of the exhaust gas purification system to reduce the emission of $NO_x$.

The feature that the E.G.R. passage 100 is connected to that branch 20 of the exhaust manifold 12 to which no secondary air is fed is advantageous in that the E.G.R. flow through the passage 100 does not contain any active component, such as oxygen, which would otherwise be recirculated from the engine exhaust system to the intake system to cause variation in the air-fuel ratio of the air-fuel mixture fed into engine cylinders. The provision of the inner tube 20' in the exhaust manifold branch 20 reliably prevents the secondary air frim being recirculated through the E.G.R. passage 100 to the intake manifold 22 of the engine.

Figure 2:
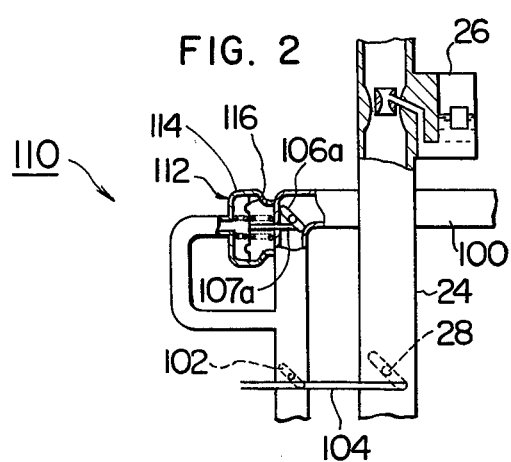

FIG. 2 illustrates a first modification of the first embodiment of the invention. In the modification, the second E.G.R. control valve is in the form of a butterfly valve 106a which is operatively connected by a link rod 107a to the diaphragm 116 of the pressure comparator and valve actuator 112 of the valve controller 110 so that the butterfly valve 106a is operated to control the cross-sectional area of the E.G.R. passage 100.

In a second modification shown in FIG. 3, the secondary air supply systems has an air injection nozzle pipe 160b having four air injection nozzles 162b to 166b and an additional air injection nozzle 167. The nozzles 162b to 166b are mounted on associated branches 14 to 18 of the exhaust manifold 12 as in the embodiment shown in FIG. 1. However, the additional air injection nozzle 167 is mounted on the branch 20 such that the secondary air is fed into the branch 20 at a point downstream of the exhaust gas delivery opening 100'. In an internal combustion engine of the type in which cylinders are arranged in line, outer branches of exhaust manifold, i.e., the branches for the engine cylinders disposed at the ends of the row of cylinders, are longer than the intermediate branches. Thus, the exhaust gas delivery opening 100' of the E.G.R. passage 100 can conveniently be disposed adjacent to the upstream end of the branch 20 and the additional air injection nozzle 167 can also conveniently be disposed adjacent to a point where all the exhaust manifold branches are gathered into a single pipe. The additional air injection nozzle 167 is thus sufficiently remote from the exhaust gas delivery opening 100' of the E.G.R. passage 100 to assure that recirculation of the secondary air back to the intake system of the engine is prevented, whereby all the secondary air is effectively used for the recombustion of the exhaust gases to thereby advantageously reduce the emission of HC and CO.

In a third modification shown in FIG. 4, the secondary air supply system includes an air injection nozzle pipe 160c having a single air injection nozzle formed by the downstream end of the pipe 160c. The air injection nozzle in this modification is connected to the exhaust manifold 122 downstream of a point where all the exhaust manifold branches 14 to 20 are gathered into one pipe.

FIG. 5 illustrates a second embodiment of the invention. Parts similar to those of the first embodiment of the invention are designated by similar reference numerals. The exhaust and intake manifolds 12 and 22 of the internal combustion engine 10 associated with the embodiment are disposed on the same side of the engine. An E.G.R. passage 100, which is substantially similar to the E.R.G. passage 100 of the first embodiment, has an upstream end extending into an exhaust port 32 of the engine 10 and open at 100' to the exhaust port 32 at a point just downstream of an exhaust valve 30. A third E.G.R. control valve 200 is provided in the E.G.R. passage 100 in addition to first and second E.G.R. control vaolves 102 and 106 which are similar in construction to those already discussed in the above. The third E.G.R. control valve 200 is disposed at a point somewhat downstream of the upstream end 100' of the E.G.R. passage 100 and upstream of the second E.G.R. control valve 106. The third valve 200 is in the form of a poppet valve which is adapted to be moved to and away from a valve seat 202 provided in the E.G.R. passage 100. For this purposes, a second valve controller 210 is provided for the third valve 200. The valve controller 210 comprises a second pressure comparator 211 of a conventional diaphragm type having a diaphragm 214 which extends across a housing 212 to divide the interior thereof into two chambers. A compression spring 216 is provided in one of the chambers which is adjacent to the valve 200 and communicated with the atmosphere through a vent hole 208. The other chamber is connected with a conduit 218 which extends therefrom into the exhaust port 32 so that the pressure in the exhaust port just downstream of the exhaust valve 30 is applied through the conduit 218 to the other chamber.

When the pressure in the exhaust port 32 is higher than a predetermined reference pressure of the pressure comparator 211, which reference pressure is determined by the spring 216, the diaphragm 214 is displaced downwardly as viewed in FIG. 5. The displacement of the diaphragm is transmitted by a valve stem 207 to the valve 200 so that an opening defined by the valve seat 202 in the E.G.R. passage 100 is opened.

Figure 6:
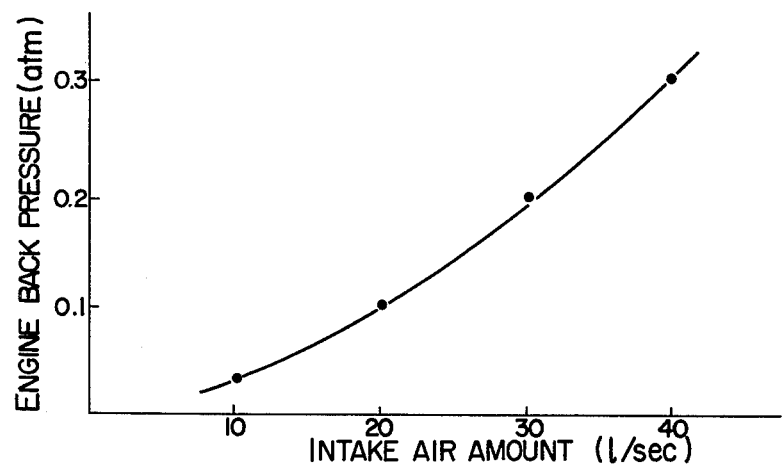
FIGS. 6 and 7 graphically illustrate the operating characteristics of the second embodiment shown in FIG. 5.
Figure 7:
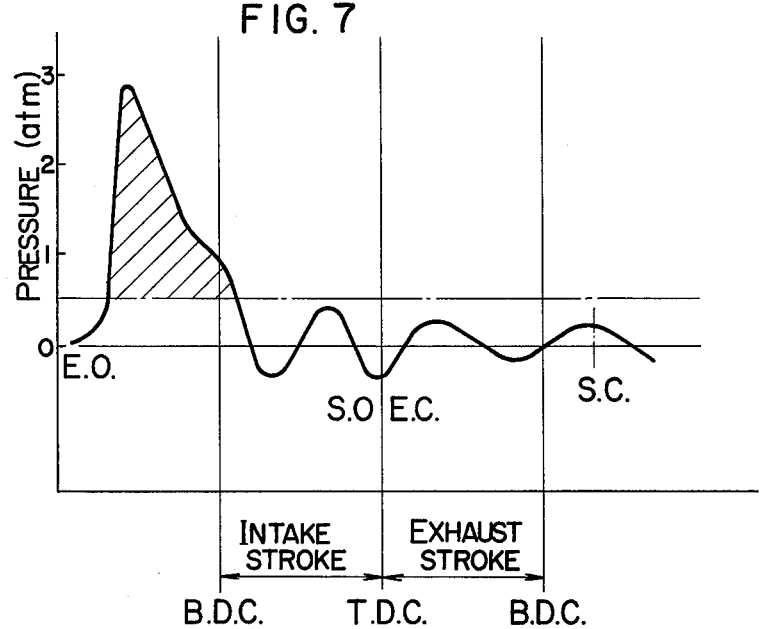

In general, engine back pressure as measured at a point where branches of exhaust manifold are gathered into a single pipe is less than 0.3 atm as will be seen in FIG. 6 which graphically illustrates variation of engine back pressure relative to the amount of intake air. On the other hand, the pressure within the exhaust port 32 varies with the engine strokes, as graphically shown in FIG. 7. A high pressure is produced in the exhaust port by the blow of exhaust gases exhausted into the exhaust port 32 just after the exhaust valve 30 is opened (indicated by "E.O." in FIG. 7). The blow of exhaust gases is also indicated in FIG. 7 by hatching. The pressure within the exhaust port 32 is less than 0.5 atm except for the blow of exhaust gases. With the above in mind, the reference pressure of the pressure comparator 211 is determined to be approximately 0.5 atm so that the third E.G.R. control valve 200 is opened only by the blow of the exhaust gases. Thus, the blow of exhaust gases passes through the opened valve 200 into an accumulator 230 which is provided in the E.G.R. passage 100 between the second and third E.G.R. control valves 106 and 200 so that the pulsating flow of the exhaust gases through the E.G.R. passage 100 into the accumulator 230 is damped thereby.

The second embodiment described above is advantageous in that only the blow of exhaust gases discharged into the exhaust port 32 of the engine just after the exhaust valve 30 is opened is admitted into the E.G.R. passage 100. Thus, neither secondary air nor any portion of the exhaust gases which contains the secondary air can flow back into the intake system of the engine.

Figure 8:
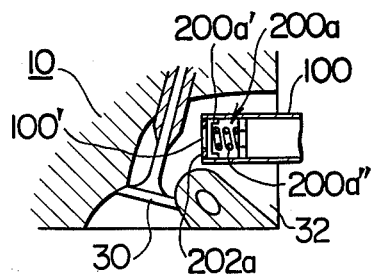
FIGS. 8 and 9 illustrate in sections first and second modifications of the second embodiment of the invention.
Figure 9:
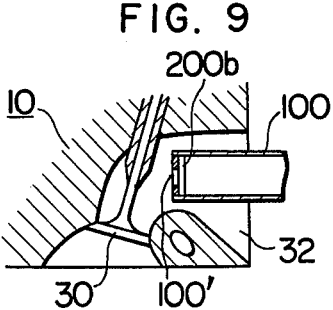

FIGS. 8 and 9 illustrate first and second modifications of the second embodiment described above. In the first modification shown in FIG. 8, the third E.G.R. control valve is in the form of a conventional relief valve 200a including a valve member 200a' which is normally resiliently urged by a compression spring. 200a" against a valve seat 202a disposed at the upstream end of the E.G.R. passage 100, the valve seat 202a defining therein an opening 100'. In the second modification shown in FIG. 9, the third E.G.R. control valve is in the form of a conventional flap valve 200b comprising a plate disposed in the E.G.R. passage 100 at the upstream end thereof and normally closing an opening of the E.G.R. passage 100 to the exhaust port 32.

Figure 10:
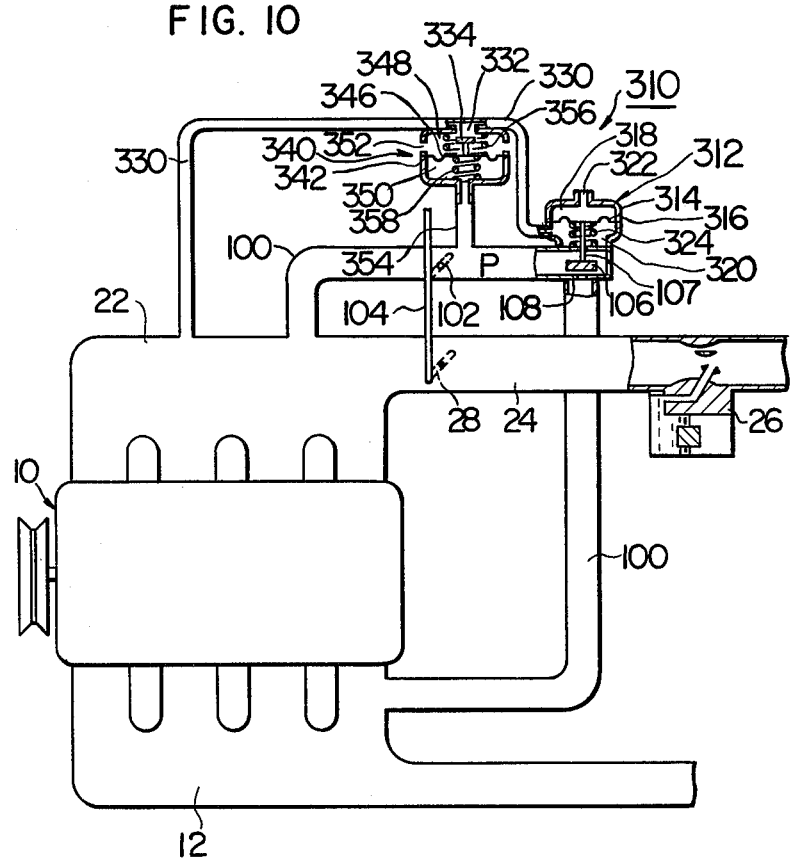
FIG. 10 is a diagrammatic illustration of a third embodiment of the invention.

FIG. 10 illustrates a third embodiment of the engine exhaust gas purification system of the invention which comprises an E.G.R. passage 100 extending from one of the branches of the exhaust manifold 12 of an engine 10 to an intake manifold 22 thereof, as in the first embodiment of the invention. First and second E.G.R. control valves 102 and 106 are provided in the E.G.R. passage 100. The first E.G.R. control valve 102 is operatively connected to a throttle valve 28 in an intake pipe 24 of the engine so that the valve 102 is controlled simultaneously with throttle valve 28 by an accelerator (not shown).

The second E.G.R. control valve 106 is in the form of a poppet valve adapted to be moved toward and away from a valve seat 108 provided in the E.G.R. passage 100, as in the first embodiment of the invention. A valve controller 310 is provided for the second E.G.R. control valve 106. The valve controller 310 includes a valve actuator 312 which comprises a housing 314. A diaphragm 316 extends across the housing 314 to divide the interior thereof into two chambers 318 and 320. The chamber 318 is vented to the atmosphere by a vent hole 322. A compression coil spring 324 is provided in the other chamber 320 and resiliently biases the diaphragm 316 toward the chamber 318. A valve stem 107 of the poppet valve 106 slidably extends into the chamber 320 and has an end secured to the diaphragm 316. The chamber 320 is pneumatically connected by a conduit 330 to the intake manifold 22 of the engine 10 so that manifold vacuum is introduced through the conduit 330 into the chamber 320 of the valve actuator 312 and tends to downwardly, as viewed in FIG. 10.

The valve controller 310 includes a pressure transducer for controlling the application of engine manifold vacuum to the diaphragm 316 of the valve actuator 312 in accordance with the pressure in the E.G.R. passage between the first and second E.G.R. control valves 102 and 106. The pressure transducer includes an opening 332 formed in the conduit 330 and a valve member 334 for controlling the area of the opening 332. The valve member 334 is actuated by a pressure comparator and valve actuator 340 which comprises a housing 342 and a diaphragm 346 extending across the housing 342 to divide the interior thereof into two chambers 348 and 350. One of the chambers 348 houses therein the valve member 334 and is vented to the atmosphere by vent holes or openings 352 so that, when the valve member 334 is in its opened position, the atmospheric air can flow through the vent holes 352 and the opening 332 into the conduit 330. The other chamber 350 is communicated by a conduit 354 with the E.G.R. passage 100 between the first and second E.G.R. control valves 102 and 106. The valve member 334 is secured to the diaphragm 346. Two compression springs 356 and 358 are provided in the chambers 348 and 350, respectively, to resiliently bias the diaphragm 346 in the opposite directions. The springs are arranged such that the diaphragm 346 is displaced downwardly, as viewed in FIG. 10, by a pressure which is the reference pressure of the pressure comparator 340 and which is substantially equal to the atmospheric pressure.

In operation, the reference pressure of the pressure comparator 340 tends to downwardly displace the diaphragm 346, as viewed in FIG. 10. On the other hand, the pressure P in the E.G.R. passage 100 between the first and second E.G.R. control valves 102 and 106 is applied through the conduit 354 to the chamber 350 of the pressure comparator 340 thus tending to upwardly displace the diaphragm 346. When the pressure P is larger than the reference pressure of the pressure comparator 340, the diaphragm 346 is displaced upwardly so that the valve member 334 is also moved upwardly toward the opening 332 in the vacuum conduit 330 to reduce the area of the opening 332 and thus the flow of atmospheric air into the vacuum conduit 330. The engine manifold vacuum in the vacuum conduit 330, which would be greatly reduced if the opening 332 is widely opened by movement of the valve member 334 away from the opening, is thus not greatly reduced so that the diaphragm 316 of the valve actuator 312 and the second E.G.R. control valve 106 connected thereto is displaced downwardly toward the valve seat 108 in the E.G.R. passage 100 to reduce the cross-sectional area of the opening defined by the valve seat 108 whereby the E.G.R. flow through the valve seat 108 toward the first E.G.R. control valve 102 is reduced with resultant reduction in the pressure P in the E.G.R. passage 100 between the first and second E.G.R. control valves 102 and 106.

On the other hand, when the pressure P in the E.G.R. passage 100 between the first and second E.G.R. control valves 102 and 106 is smaller than the reference pressure of the pressure comparator 340, the diaphragm 346 of the pressure comparator 340 and the valve member 334 connected thereto are moved downwardly away from the opening 332 in the vacuum conduit 330 so that the area of the opening 332 is increased to increase the flow of the atmospheric air into the vacuum conduit 330. Thus, the engine manifold vacuum applied to the diaphragm 316 of the valve actuator 312 is greatly reduced to allow the diaphragm 316 and thus the second E.G.R. control valve 106 to be upwardly displaced away from the valve seat 108 by the spring 324 with the result that the E.G.R. flow through the valve seat 108 toward the first E.G.R. control valve 102 is increased with resultant increase in the pressure P in the E.G.R. passage 100 between the first and second E.G.R. control valves 102 and 106. Thus, the pressure P is maintained at a substantially constant value which is approximately equal to the atmospheric pressure in the embodiment of the invention.

The amount of E.G.R. flow is thus proportional to the amount of engine intake air for the reasons discussed in connection with the first embodiment of the invention. Thus, the embodiment of the exhaust gas purification system of the invention also advantageously reduces the emission of $NO_x$ without any adverse influence to the engine operation. The engine manifold vacuum used in the embodiment advantageously provides a powerful signal to the valve actuator 312 so that the second E.G.R. control valve 106 can be easily and promptly actuated to maintain the pressure P in the E.G.R. passage 100 at a substantially constant value.

Figure 11:
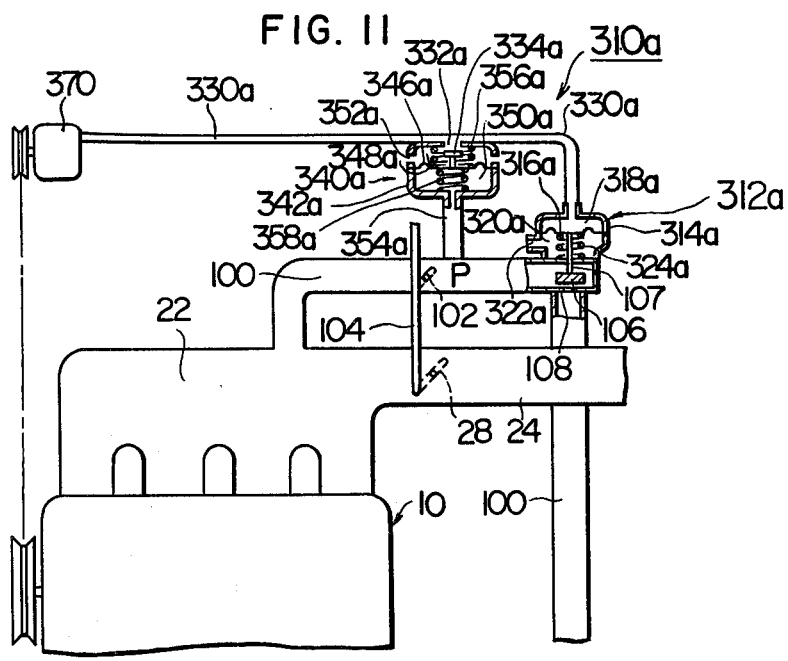
FIGS. 11 and 12 diagrammatically illustrate first and second modifications of the third embodiment shown in FIG. 10.

FIG. 11 illustrates a first modification of the third embodiment shown in FIG. 10. Parts similar to those of the embodiment shown in FIG. 10 are designated by similar reference numerals added with character a. The modification is that a valve controller 310a includes a valve actuator 312a to which positive pressure produced by an air pump 370 is applied. The valve actuator 312a is substantially similar in structure to the valve actuator 312 of the embodiment shown in FIG. 10 with the exceptions that the positive pressure from the air pump 370 is introduced into a chamber 318a which is remote from the second E.G.R. control valve 106 and that the other chamber 320a, which is adjacent to the valve 106, is vented to the atmosphere by a vent hole 322a.

A pressure transducer for controlling the positive pressure to be supplied to the valve actuator 312a includes an opening 332a formed in a pressure conduit 330a extending from the air pump 370 to the chamber 318a of the valve actuator 312a. The area of the opening 332a is controlled by a valve member 334a which is actuated by a pressure comparator and valve actuator 340a which is substantially similar in construction to the pressure comparator and valve actuator 340 of the embodiment shown in FIG. 10.

The modification shown in FIG. 11 operates as follows: When the pressure P in the E.G.R. passage 100 between the first and second E.G.R. control valves 102 and 106 is higher than the reference pressure of the pressure comparator 340a, the amount of air discharged from the pressure conduit 330a through the opening 332a into the atmosphere is decreased with resultant increase in the pressure applied to the chamber 318a of the valve actuator 312a so that the diaphragm 316a and thus the second E.G.R. control valve 106 are displaced downwardly against the spring 324a to reduce the E.G.R. flow through the opening defined by the valve seat 108 in the E.G.R. passage 100 and thus reduce the pressure P.

On the other hand, when the pressure P is lower than the reference pressure of the pressure comparator 340a, the diaphragm 346a of the pressure comparator 340a and the valve member 334a are displaced downwardly away from the opening 332a to increase the amount of air discharged from the pressure conduit 330a through the opening 332a into the atmosphere with resultant decrease in the pressure supplied to the chamber 318a of the valve actuator 312a. Thus, the diaphragm 316a and the second E.G.R. control valve 106 are upwardly moved by the spring 324a away from the valve seat 108 in the E.G.R. passage 100 to increase the E.G.R. flow through the valve seat 108 toward the first E.G.R. control valve 102 with resultant increase in the pressure P. The pressure P can therefore be maintained at a substantially constant value, as in the embodiment shown in FIG. 10.

Figure 12:
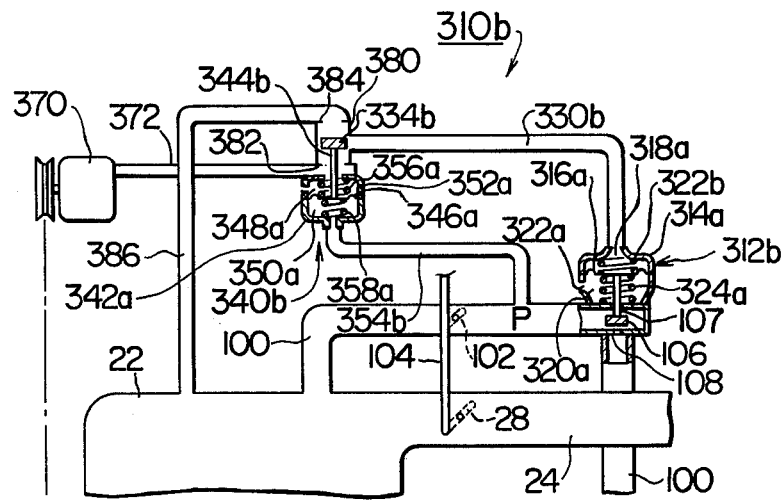

FIG. 12 illustrates a second modification of the third embodiment of the invention shown in FIG. 10. The modification comprises a valve controller 310b which includes a valve actuator 312b for actuating the second E.G.R. control 106. The valve actuator 312b is substantially similar in construction to the valve actuator 312a shown in FIG. 11. The parts of the valve actuator 312b similar to those of the valve actuator 312a in FIG. 11 are designated by similar reference numerals. Only difference is that a second compression spring 322b is provided in the chamber 318a, which is remote from the second E.G.R. control valve 106, so that the reference pressure for the valve actuator 312b is determined by two compression springs 322b and 324a which resiliently bias the diaphragm 316a in the opposite directions.

The chamber 318a is connected with a conduit 330b which in turn is connected to a valve housing 380 in which a valve member 334b is reciprocally mounted. The valve housing 380 is provided with valve seats 382 and 384 formed at the bottom and top of the valve housing 380. The bottom and top of the valve housing 380 are connected by conduits 386 and 372 to the engine intake manifold 22 and the air pump 370, respectively. The valve seats 382 and 384 are disposed at the junctions between the valve housing 380 and the conduit 386 and between the valve housing 380 and the conduit 372, respectively.

The valve member 334b is adapted to be actuated by a pressure comparator and valve actuator 340b which is similar in construction to the pressure comparator and valve actuator 340a shown in FIG. 11. Parts of the pressure comparator and valve actuator 340b similar to those of the pressure comparator and valve actuator 340a are designated by similar reference numerals. The valve member 334b is connected by a valve stem 344b to the diaphragm 346a of the pressure comparator and valve actuator 340b. A conduit 354b communicates the chamber 350b of the valve actuator 340b with the E.G.R. passage 100 between the first and second E.G.R. control valves 102 and 106.

In operation, when the pressure P in the E.G.R. passage 100 between the first and second E.G.R. control valves 102 and 106 is higher than the reference pressure of the pressure comparator and valve actuator 340b, which reference pressure is determined by the springs 356a and 358a, the diaphragm 346a and the valve member 344b are moved upwardly as viewed in FIG. 12 until the valve member is moved into sealing engagement with the valve seat 384 so that the conduits 330b and 372 are brought into communication with each other. Thus, pressurized air from the air pump 372 is introduced into the chamber 318a of the valve actuator 312b to downwardly displace the diaphragm 316a and the second E.G.R. control valve 106 downwardly toward the valve seat 108 in the E.G.R. passage 100 so that the E.G.R. flow through the valve seat 108 is decreased with resultant decrease in the pressure P.

On the other hand, when the pressure P is lower than the reference pressure of the pressure comparator and valve actuator 340b, the diaphragm 346a is displaced downwardly to move the valve member 334b into sealing engement with the lower valve seat 382 in the valve housing 380 so that the conduits 330b and 386 are now brought into communication with each other. Thus, the manifold vacuum is applied through these conduits 386 and 330b to the chamber 318a of the valve actuator 312b so that the diaphragm 316a and the second E.G.R. control valve 106 are moved upwardly away from the valve seat 108 in the E.G.R. passage 100 to increase the E.G.R. flow through the valve seat 108 toward the first E.G.R. control valve 102 with resultant increase in the pressure P. Thus, the pressure P can be maintained at a substantially constant value, as in the preceding embodiments.

Figure 13:
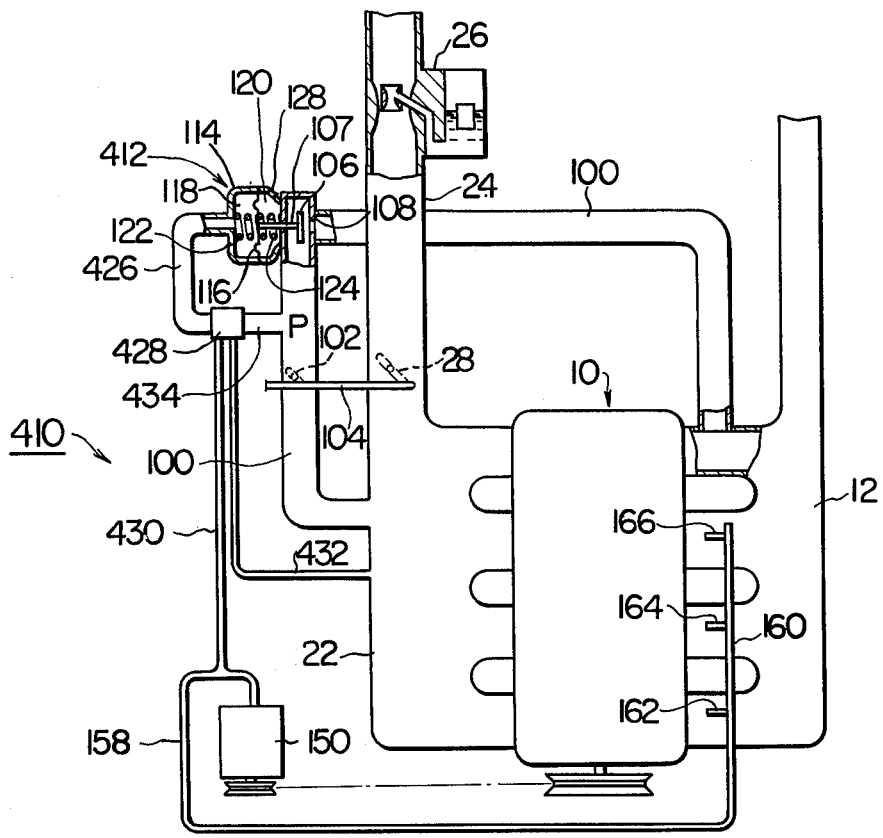
FIG. 13 diagrammatically illustrates a fourth embodiment of the invention.

FIG. 13 illustrates a fourth embodiment of the invention which includes a secondary air supply system which is similar in structure to the secondary air supply system of the first embodiment of the invention shown in FIG. 1. Parts of the secondary air supply system of the fourth embodiment similar to those of the first embodiment are designated by similar reference numerals.

The embodiment also includes an E.G.R. system which itself is substantially similar in construction to the E.G.R. system of the first embodiment of the invention shown in FIG. 1. Similar parts of the E.G.R. system of the embodiment are designated by similar reference numerals. The E.G.R. system includes first and second E.G.R. control valves 102 and 106 provided in an E.G.R. passage 100. A valve controller 410 is provided for controlling the second E.G.R. control valve 106.

The valve controller 410 includes a valve actuator which is generally designated by reference numeral 412 and which is substantially similar in structure to the pressure comparator and valve actuator 112 of the first embodiment shown in FIG. 1. Parts of the valve actuator 412 similar to those of the valve actuator 112 are designated by similar ference numerals. One of the chambers 118 of the valve actuator 412 is pneumatically connected by a first conduit 426 to a pressure transducer 428 which, in the illustrated embodiment of the invention, is in the form of a pressure amplifier which in turn is pneumatically connected by second, third and fourth conduits 430, 432 and 434 to a secondary air supply pipe 158 of the secondary air supply system, to the intake manifold 22 of the engine 10 and to the E.G.R. passage 100 between the first and second E.G.R. control valves 102 and 106, respectively.

Figure 14:
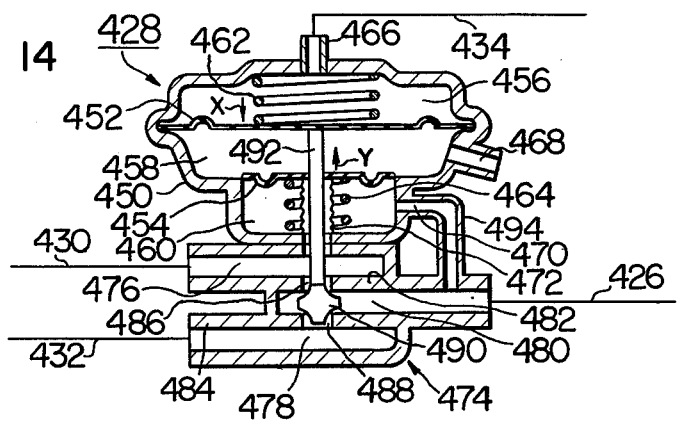
FIG. 14 is an enlarged sectional view of a pressure transducer used in the fourth embodiment shown in FIG. 13.

Referring to FIG. 14, the pressure amplifier 428 comprises a housing 450 which contains a pair of substantially parallel diaphragms 452 and 454 extending across the interior of the housing 450 to cooperate therewith to define three chambers 456, 458 and 460. Compression coil springs 462 and 464 are disposed in the chambers 456 and 460 and extend between the diaphragm 452 and the housing 450 and between the diaphragm 454 and the housing 450, respectively. The chamber 456 has a pressure inlet port 466 connected to the fourth conduit 434. The chamber 458 is vented to the atmosphere by a vent hole 468. The other chamber 460 is provided with a port 470 formed in the housing 450. A bellows 472 is disposed inside the coil spring 464 in the chamber 460 and extends between the diaphragm 454 and the housing 450.

A valve housing 474 is mounted on the side of the housing 450 adjacent to the chamber 460. The valve housing 474 defines three chambers 476, 478 and 480 which are arranged in overlapping relationship with each other and which are separated by partitions 482 and 484. Aligned openings 486 and 488 are formed in the partitions 482 and 484. A valve member 490 is disposed in the intermediate chamber 480 in opposite relationship with the aligned openings 486 and 488 and has a valve stem 492 extending into the housing 450 through an opening in the housing 450. The valve stem 492 extends axially through the bellows 472 and is rigidly secured to both diaphragms 452 and 454. The chambers 476, 478 and 480 are connected to the conduits 430, 432 and 426, respectively. In addition, the chamber 480 is connected by a conduit 494 to the chamber 460 in the housing 450.

It is assumed that the pressure within the E.G.R. passage 100 between the first and second E.G.R. control valves 102 and 106 is P (which is of a positive value) and the pressure within the conduit 426 is $P_1$ (which is of positive value). It is also assumed that the ratio of area A of the first diaphragm 452 relative to the area $A_1$ of the second diaphragm 454 is K:1 where K is larger than 1. A force represented by $P \times A$ acts on the first diaphragm 452 in the direction of an arrow X, whereas a force represented by $P_1 \times A_1$ acts on the second diaphragm 454 in the direction of an arrow Y. If the force $P \times A$ is larger tha the force $P_1 \times A_1$, the valve member 490 is moved in the direction of the arrow X to increase the area of the opening 486 and decrease the area of the opening 488 so that the flow of air from the air pump 158 into the chamber 480 and thus to the conduit 426 and the valve actuator 412 is increased while the application of the engine manifold vacuum to the chamber 480 is decreased, with the result that the pressure $P_1$ in the conduit 426 is increased.

On the other hand, if the force $P \times A$ is small than the force $P_1 \times A_1$, the valve member 490 is moved in the direction of the arrow Y to decrease the area of the opening 486 and increase the area of the opening 488 with the result that the application of the engine manifold vacuum to the chamber 480 and thus to the conduit 426 is greatly increased with resultant decrease in the pressure $P_1$ in the conduit 426. As such, the force $P_1 \times A_1$ and the force $P \times A$ are equilibrated.

It will be noted from the above that A divided by $A_1$ equals K ($A/A_1 = K$). Thus, $$\frac{P \cdot A}{A_1} = \frac{P \cdot K \cdot A_1}{A_1} = K \cdot P.$$

This will mean that the pressure P is amplified by K times into the pressure $P_1$. This is also true with the case where the pressures P and $P_1$ are vacuum pressures.

The pressure $P_1$ is applied to the chamber 118 of the valve actuator 412. When the pressure $P_1$ is higher than the reference pressure of the valve actuator 412 which is determined by the springs 122 and 124 and which is approximately equal to the atmospheric pressure, the diaphragm 116 and the second E.G.R. control valve 106 are moved toward the valve seat 108 to reduce the E.G.R. flow through the E.G.R. passage 100 toward the first E.G.R. control valve 102 with resultant decrease in the pressure P in the E.G.R. passage 100 between the first and second E.G.R. control valves 102 and 106. On the other hand, when the pressure $P_1$ in the conduit 426 is lower than the reference pressure of the valve actuator 412, the diaphragm 116 and the second E.G.R. control valve 106 are moved away from the valve seat 108 in the E.G.R. passage 100 to increase the E.G.R. flow through the E.G.R. passage 100 toward the first E.G.R. control valve 102 with resultant increase in the pressure P. Thus, the pressure P is maintained at a substantially constant value which is approximately equal to the atmospheric pressure in the embodiment of the invention.

The pressure transducer 428 which is in the form of the pressure amplifier in the illustrated embodiment of the invention is advantageously operative to amplify the pressure P to an appropriately increased pressure $P_1$ to be applied to the valve actuator 412 whereby the operation thereof can be precisely controlled with resultant precise control of the pressure P in the E.G.R. passage between the first and second E.G.R. control valves 102 and 106.

The pressure transducer 428 may alternatively be in the form of a pressure attenuator which is not shown but may be easily obtained by modifying the pressure amplifier 428 such that the area of the second diaphragm 454 is larger than that of the first diaphragm 452.

Figure 15:
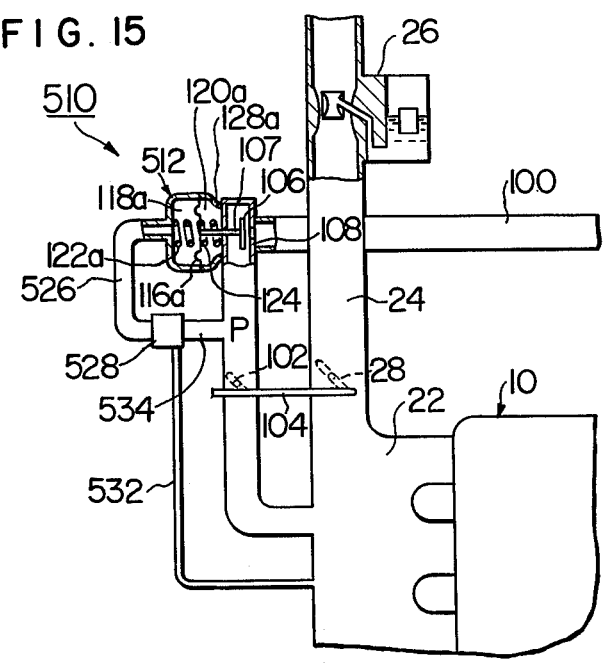
FIG. 15 diagrammatically illustrates a fifth embodiment of the invention.
Figure 16:
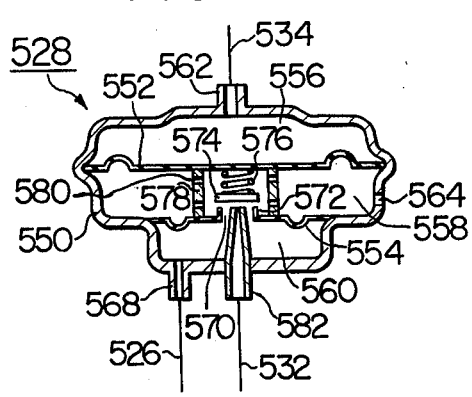
FIG. 16 is an enlarged sectional view of a pressure transducer used in the fifth embodiment shown in FIG. 15.

FIGS. 15 and 16 illustrate a fifth embodiment of the invention, which comprises an E.G.R. system including an E.G.R. passage 100. First and second E.G.R. control valves 102 and 106 are provided in the E.G.R. passage 100, as in the preceding embodiments. A valve controller 510 is provided for the second E.G.R. control valve 106. The valve controller 510 includes a valve actuator 512 which is similar in construction to the pressure comparator and valve actuator 112 of the first embodiment shown in FIG. 1 with the exception that the reference pressure of the valve actuator 512 is operative to bias the second E.G.R. control valve 106 toward a valve seat 108 in the E.G.R. passage 100. Parts of the valve actuator 512 similar to those of the valve actuator 112 of the first embodiment are designated by similar reference numerals added with a character a.

One of the chambers 118a of the valve actuator 512, which is remote from the second E.G.R. control valve 106, is pneumatically connected by a first conduit 526 to a pressure transducer 528 which, in the illustrated embodiment of the invention, is in the form of a pressure amplifier which in turn is pneumatically connected by second and third conduits 532 and 534 to the intake manifold 22 and the E.G.R. passage 100 between the first and second E.G.R. control valves 102 and 106, respectively.

Referring to FIG. 16, the pressure amplifier 528 comprises a housing 520 and a pair of substantially parallel diaphragms 552 and 554 extending across the interior of the housing 550 to cooperate therewith to define three chambers 556, 558 and 560. The chamber 556 has a pressure inlet port 562 which is connected to the third conduit 534. The second chamber 558 is vented to the atmosphere through a vent hole 564 formed in the housing 550. The third chamber 560 has a port 568 which is connected to the first conduit 526. The second diaphragm 554 is formed with an opening 570 disposed centrally thereof. A valve seat 572 is mounted on the diaphragm 554 around the opening 570. A valve member 574 is mounted on the first diaphragm 552 in opposed relationship with the valve seat 572. A compression coil spring 576 is interposed between the valve member 574 and the first diaphragm 552. The first and second diaphragms 552 and 554 are connected together by an annular member 578 which extends therebetween and around the valve seat 572, valve member 574 and the coil spring 576 and which is provided with a plurality of apertures 580. A tube 582 is hermetically secured to the wall of the housing 550 adjacent to the third chamber 560 and extends therethrough into the opening 570 in the second diaphragm 554 so that an annular gap is defined between the tube 582 and the peripheral edge of the opening 570. The inner end of the tube 582 is substantially flush with the valve seat 572, while the outer end of the tube 582 is connected to the second conduit 532.

In operation, in the case where the pressure introduced into the first chamber 556 is a vacuum pressure, the vacuum acts on the first diaphragm 552. When the vacuum is increased, the first diaphragm 552 is displaced upwardly as viewed in FIG. 16 to displace the second diaphragm 554 upwardly. The valve member 574 is thus moved upwardly away from the inner end of the tube 582 so that the manifold vacuum is applied through the second conduit 532 and the tube 582 to the third chamber 560 with resultant increase in the vacuum in the third chamber 560. If the vacuum in the third chamber 560 is extremely increased or if the vacuum applied to the first chamber 556 is decreased, the second diaphragm 554 is displaced downwardly as viewed in FIG. 16 to move the valve member 574 into sealing engagement with the inner end of the tube 582 so that the application of the manifold vacuum to the third chamber 560 is interrupted. If the second diaphragm 554 is further moved downwardly with the valve member 574 being engaged with the inner end of the tube 582 and thus held stationary, the valve seat 572 on the second diaphragm 554 is moved downwardly away from the valve member 574 so that the atmospheric air flows from the second chamber 558 through the annular gap between the peripheral edge of the opening 570 and the tube 582 into the third chamber 560 to decrease the vacuum therein. As such, the vacuum introduced into the third chamber 560 is amplified by times which are determined by the ratio of the area of the first diaphragm 552 relative to the area of the second diaphragm 554. The amplified vacuum is fed from the third chamber 560 through the port 568 and the first conduit 526 into the chmaber 118a of the valve actuator 512.

If the pressure introduced into the first chamber 556 of the pressure amplifier 528 is a positive pressure, the valve member 574 is kept in sealing engagement with the inner end of the tube 582 with the result that the pressure in the third chamber 560 is increased to the atmospheric pressure.

The valve controller 510 is arranged such that, when the pressure P in the E.G.R. passage 100 between the pressure and second E.G.R. control valves 102 and 106 is positive pressure, the atmospheric pressure is fed from the third chamber 560 of the pressure amplifier 528 through the conduit 526 into the chamber 118a of the valve actuator 512 so that the second E.G.R. control valve 106 is moved toward the valve seat 108 to decrease the E.G.R. flow toward the first E.G.R. control valve 102 with resultant decrease in the pressure P. On the other hand, when the pressure P is a vacuum pressure, the engine manifold vacuum applied to the third chamber 560 of the pressur amplifier 528 is amplified thereby and fed through the conduit 526 into the chamber 118a of the valve actuator 512 so that the second E.G.R. control valve 106 is moved away from the valve seat 108 to increase the E.G.R. flow therethrough toward the first E.G.R. control valve 102 with resultant increase in the pressure P. Thus, the pressure P is maintained at a substantially constant value which is substantially equal to the atmospheric pressure or a vacuum pressure substantially near to the atmospheric pressure.

Figure 17:
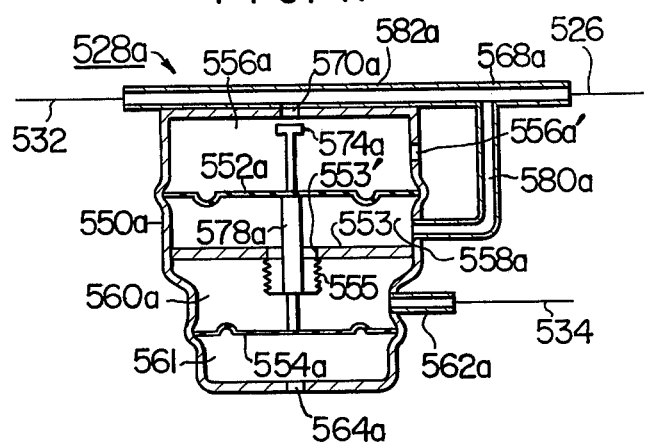
FIG. 17 is an enlarged sectional view of a modified pressure transducer for the fifth embodiment.

The pressure transducer 528 may alternatively be in the form of a pressure attenuator 528a shown in FIG. 17. The pressure attenuator 528a comprises a housing 550a having one end hermetically secured to a tube 582a which is connected at one end 568a to the first conduit 526 of the valve controller 510. The other end of the tube 582a is connected to the second conduit 532 of the valve controller 510. An opening 570a is formed in the laminated end wall of the housing 550a and the peripheral wall of the tube 582a. A pair of substantially parallel diaphragms 552a and 554a and a partition 553, which is disposed between the diaphragms, extends across the interior of the housing 550a to divide the interior of the housing into four chambers 556a, 558a, 560a and 561. The diaphragms and the partition are substantially parallel to the end wall of the housing in which the opening 570a is formed. An opening 553' is formed in the partition 553 substantially centrally thereof. A valve member 574a is disposed in the first chamber 556a in opposed relationship to the opening 570a and has a valve stem 578a which extends from the valve member 574a through the first diaphragm 552a and through the opening 553' in the partition 553 to the second diaphragm 554a and is secured to the first and second diaphragms 552a and 554a so that the two diaphragms are movable together. A bellows member 555 is provided to form a flexible seal between the partition 553 and the valve stem 578a. The first chamber 556a has an atmospheric air intake port 556a'. The second chamber 558a is pneumatically connected by a conduit 580a to the tube 582a adjacent to the end 568a thereof. The third chamber 560a has a port 562a connected to the third conduit 534 of the valve controller 510. The fourth chamber is vented to the atmosphere by a vent hole 564a formed in the bottom wall of the housing remote from the tube 582a.

The pressure receiving area of the second diaphragm 554a is smaller than that of the first diaphragm 552a. The pressure receiving area of the bellows member 555 is smaller than that of the second diaphragm 554a.

In operation, in the case where the pressure P supplied from the E.G.R. passage 100 through the fourth conduit 534 into the third chamber 560a of the pressure attenuator 528a is a vacuum pressure, the valve stem 578a is moved upwardly as viewed in FIG. 17 as the vacuum in the third chamber 560a is increased, so that the valve member 574a is moved toward the opening 570a to decrease the flow of the atmosphere air from the first chamber 556a through the opening 570a into the tube 582a with resultant increase in the vacuum in the tube 582a and also in the second chamber 550a of the pressure attenuator 528a. If the vacuum in the chamber 550a is extremely increased or if the vacuum in the third chamber 560a is decreased, the valve stem 578a is moved downwardly as viewed in FIG. 17 to increase the flow of the atmospheric air from the first chamber 556a through the opening 570a into the tube 582a with resultant decrease in the vacuum in the tube 582a. As such, the engine manifold vacuum supplied through the conduits 532 and 526 to the valve actuator 512 is attenuated at a predetermined ratio which is determined by the ratio of the pressure receiving area of the first diaphragm 552a to the pressure receiving area of the second diaphragm 554a.

In the case where the pressure P is a positive pressure and supplied to the third chamber 560a of the pressure attenuator 528a, the valve stem 578a and the valve member 574a are moved downwardly as viewed in FIG. 17 away from the opening 570a, so that the atmospheric pressure is introduced through the opening 570a into the tube 582a and thus into the first conduit 526, with the result that the diaphragm 116a and the second E.G.R. control valve 106 are moved toward the valve seat 108 to decrease the E.G.R. flow through the E.G.R. passage 100 toward the first E.G.R control valve 102 with resultant decrease in the pressure P until the pressure P is lowered to a substantially constant value.

What is claimed is:

1. An exhaust gas purification system for an internal combustion engine comprising an E.G.R. passage for recirculating engine exhaust gases from an exhaust system of an internal combustion engine back into an intake system thereof downstream of a throttle valve of said engine, a first E.G.R. control valve disposed in said E.G.R. passage and operatively connected to said throttle valve to control the E.G.R. flow through said E.G.R. passage into said engine, a second E.G.R. control valve disposed in said E.G.R. passage upstream of said first E.G.R. control valve to control the E.G.R. flow through said E.G.R. passage toward said first E.G.R. control valve, and means for controlling said second E.G.R. control valve so that the pressure of engine exhaust gases in said E.G.R. passage between said first and second E.G.R. control valves is maintained substantially constant.

2. An exhaust gas purification system according to claim 1, wherein said means for controlling said second E.G.R. control valve comprise means operative directly in response to variation in the exhaust gas pressure in said E.G.R. passage between said first and second E.G.R. control valves to actuate said second E.G.R. control valve.

3. An exhaust gas purification system according to claim 1, wherein said means for controlling said second E.G.R. control valve comprise signal pressure source means, means in fluid flow communication with said signal pressure source means for actuating said second E.G.R. control valve in accordance with the magnitude of a pressure signal from said signal pressure source means, and pressure transducer means responsive to variation in the exhaust gas pressure in said E.G.R. passage between said first and second E.G.R. control valves to modulate the magnitude of the signal pressure from said signal pressure source means to said second E.G.R. control valve actuating means.

4. An exhaust gas purification system according to claim 1, further including means for feeding a secondary air into said exhaust system of said engine for the re-combustion of the engine exhaust gases, and means for preventing the secondary air from flowing from said exhaust system into said E.G.R. passage.

5. An exhaust gas purification system according to claim 2, wherein said means to actuate said second E.G.R. control valve comprise a housing, a diaphragm extending across the interior of said housing to cooperate therewith to define a chamber pneumatically connected to said E.G.R. passage between said first and second E.G.R. control valves, said diaphragm being operatively connected to said second E.G.R. control valve.

6. An exhaust gas purification system according to claim 3, wherein said means for actuating said second E.G.R. control valve comprise a first housing, a first diaphragm extending across the interior of said first housing to cooperate therewith to define a first chamber pneumatically connected to said signal pressure source means, and wherein said pressure transducer means comprise a second housing, a second diaphragm extending across the interior of said second housing to cooperate therewith to define a second chamber pneumatically connected to said E.G.R. passage between said first and second E.G.R. control valves, and a valve means operatively connected to said second diaphragm to control the magnitude of the signal pressure from said signal pressure source means to said first chamber, said second diaphragm being responsive to variation in the exhaust gas pressure in said E.G.R passage between said first and second E.G.R. control valves to actuate said valve means.

7. An exhaust gas purification system according to claim 6, wherein said signal pressure source means include a conduit extending from said first chamber to said intake system of said engine downstream of said throttle valve, said conduit having an opening fromed in the peripheral wall thereof, said valve means of said pressure transducer being operative to control the flow of atmospheric air through said opening into said conduit.

8. An exhaust gas purification system according to claim 6, wherein said signal pressure source means include an air pump drive by said engine, a conduit extending between said air pump and said first chamber, said conduit having an opening formed in the peripheral wall thereof, said valve means of said pressure transducer means being operative to control the flow of pressurized air from said conduit through said opening into the atmosphere.

9. An exhaust gas purification system according to claim 6, wherein said pressure transducer means include a valve housing in which said valve means is movably housed, said valve housing being pneumatically connected to said first chamber, and wherein said signal pressure source means comprise an air pump, a first conduit penumatically connecting said air pump to said valve housing and a second conduit pneumatically connecting said valve housing to said intake system of said engine downstream of said throttle valve, said valve means being operative to control the communication between said first chamber and said first conduit and between said first chamber and said second conduit.

10. An exhaust gas purification system according to claim 9, further including a secondary air supply means including a secondary air passage pneumatically connecting said air pump to said exhaust system of said engine.

11. An exhaust gas purification system according to claim 3, wherein said means for actuating said second E.G.R. control valve comprise a housing, a diaphragm extending across the interior of said housing to cooperate therewith to define a chamber pneumatically connected to said pressure transducer means, said signal pressure source means comprising a vacuum conduit extending between said pressure transducer means and said intake system of said engine downstream of said throttle valve to feed engine intake vacuum into said pressure transducer means, said pressure transducer means being also pneumatically connected to said E.G.R. passage between said first and second E.G.R. control valves and operative in response to variation in the exhaust gas pressure in said E.G.R. passage between said first and second E.G.R. control valves to modulate the engine intake vacuum fed into said pressure transducer means and transmit the thus modulated engine intake vacuum to said chamber of said second E.G.R. control valve actuating means.

12. An exhaust gas purification system according to claim 11, wherein said pressure transducer means comprises a pressure amplifier and is operative to amplify the engine intake vacuum.

13. An exhaust gas purification system according to claim 11, wherein said pressure transducer means comprises a pressure attenuator and is operative to attenuate the engine intake vacuum.

14. An exhaust gas purification system according to claim 4, wherein said E.G.R. passage is connected to one of branches of an exhaust manifold of said engine and wherein said secondary air feeding means include secondary air nozzles mounted on the other branches of exhaust manifold.

15. An exhaust gas purification system according to claim 14, wherein said means for preventing the secondary air from flowing from said exhaust system into said E.G.R. passage comprises a tubular member disposed in said one branch and extending over an opening of said E.G.R. passage to said one branch, said tubular member having an upstream portion spaced from the inner peripheral surface of said one branch to cooperate therewith to define a space to which said E.G.R. passage is open, said tubular member having a downstream end engaging the inner peripheral surface of said one branch.

16. An exhaust gas purification system according to claim 14, wherein said secondary air feeding means further include an additional secondary air nozzle mounted on said one branch so that the secondary air is fed into said one branch at a point downstream of said upstream portion of said tubular member.

17. An exhaust gas purification system according to claim 4, wherein said E.G.R. passage is connected to said exhaust system at a first point thereof and wherein said secondary air feeding means include a single secondary air nozzle connected to said exhaust system at a second point downstream of said first point.

18. An exhaust gas purification system according to claim 4, wherein said E.G.R. passage has an upstream end extending into an exhaust port of said engine and wherein said means for preventing the secondary air from flowing into said E.G.R. passage comprise a third E.G.R. control valve disposed in said E.G.R. passage upstream of said second E.G.R. control valve, said third E.G.R. control valve being moved to an open position only when a blow of engine exhaust gases enters said exhaust port just after an exhaust valve of said engine associated with said exhaust port is opened, to thereby allow said blow of exhaust gases to flow through said E.G.R. passage toward said second E.G.R. control valve.

19. An exhaust gas purification system according to claim 18, wherein said secondary air feeding means include a secondary air nozzle extending into said exhaust port and wherein said means for preventing the secondary air from flowing into said E.G.R. passage further include means pneumatically communicated with said exhaust port and mechanically connected to said third E.G.R. control valve and being operative in response to the blow of exhaust gases to actuate said third E.G.R. control valve to said open position.

20. An exhaust gas purification system according to claim 18, wherein said third E.G.R. control valve comprises a valve member normally closing the upstream end of said E.G.R. passage and is opened by the blow of the exhaust gases discharged into said exhaust port of said engine.

* * * * *